(12) United States Patent
Horiuchi

(10) Patent No.: US 7,017,929 B2
(45) Date of Patent: Mar. 28, 2006

(54) EXPANDABLE BICYCLE HEADSET STRUCTURE

(75) Inventor: Noriyuki Horiuchi, Higashiosaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/699,833

(22) Filed: Nov. 4, 2003

(65) Prior Publication Data

US 2005/0093269 A1    May 5, 2005

(51) Int. Cl.
*B62K 21/18*    (2006.01)
(52) U.S. Cl. .................. 280/279; 74/551.1
(58) Field of Classification Search ............. 74/551.1; 280/279, 270, 276
See application file for complete search history.

(56) References Cited

U.S. PATENT DOCUMENTS

| | | | |
|---|---|---|---|
| 3,284,114 A * | 11/1966 | McCord, Jr. et al. ....... 403/370 |
| 3,833,242 A * | 9/1974 | Thompson, Jr. ......... 280/281.1 |
| 4,274,301 A | 6/1981 | Katayama |
| 4,310,260 A | 1/1982 | Katayama |
| 4,340,238 A * | 7/1982 | Cabeza ....................... 280/279 |
| 4,435,983 A * | 3/1984 | Shimano ..................... 73/493 |
| 4,489,307 A * | 12/1984 | Nagano ...................... 340/432 |
| 4,593,924 A * | 6/1986 | Cabeza ....................... 280/279 |
| 5,095,770 A | 3/1992 | Rader, III |
| 5,305,654 A | 4/1994 | Durham |
| 5,319,993 A | 6/1994 | Chiang |
| 5,330,220 A | 7/1994 | Nagano |
| 5,331,864 A * | 7/1994 | Chi ............................ 74/551.1 |
| 5,454,281 A * | 10/1995 | Chi ............................ 74/551.1 |
| 5,496,126 A * | 3/1996 | Lin ............................ 403/370 |
| 5,540,457 A | 7/1996 | Johnson |
| 5,647,684 A | 7/1997 | Chen |
| 5,681,119 A * | 10/1997 | Marui ........................ 384/545 |
| 5,800,071 A | 9/1998 | Chi |
| 5,826,898 A | 10/1998 | Fortier et al. |
| 5,918,895 A | 7/1999 | Chi |
| 5,971,116 A | 10/1999 | Franklin |
| 6,019,017 A | 2/2000 | Lin |
| 6,149,174 A | 11/2000 | Bohn |
| 6,167,780 B1 | 1/2001 | Chen |
| 6,254,115 B1 | 7/2001 | Lin |
| 6,343,806 B1 | 2/2002 | Lee |
| 6,416,071 B1 | 7/2002 | Marui |
| 6,543,799 B1 | 4/2003 | Miyoshi |
| 6,612,599 B1 | 9/2003 | Miyoshi |
| 2003/0110880 A1 * | 6/2003 | Tison et al. ............... 74/551.8 |
| 2003/0140727 A1 | 7/2003 | Chuang |
| 2003/0230228 A1 | 12/2003 | Kinoshita |

FOREIGN PATENT DOCUMENTS

WO    WO03/051708 A1    6/2003

* cited by examiner

*Primary Examiner*—Lesley D. Morris
(74) *Attorney, Agent, or Firm*—Shinjyu Global IP Counselors, LLP

(57) ABSTRACT

An expandable bicycle headset structure is provided to aid in the mounting of a steerer tube of a front fork to a head tube of a bicycle frame. The headset structure has a first tubular member and a second tubular member that are mounted on the steerer tube. The first and second tubular members have bores that are sized to receive the steerer tube therethrough. The first and second mating adjustment structures are adjustably coupled together to change an effective overall axial length of the expandable bicycle headset structure. Thus, the first and second mating adjustment structures apply an axial force to a headset that rotatably mounts the steerer tube of the front fork to the head tube of the bicycle frame.

22 Claims, 11 Drawing Sheets

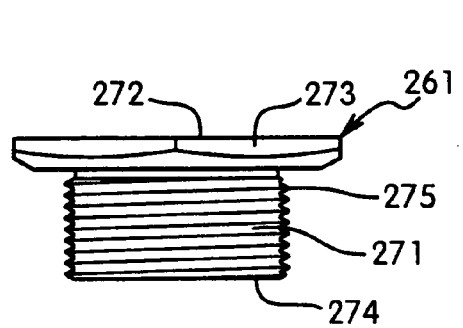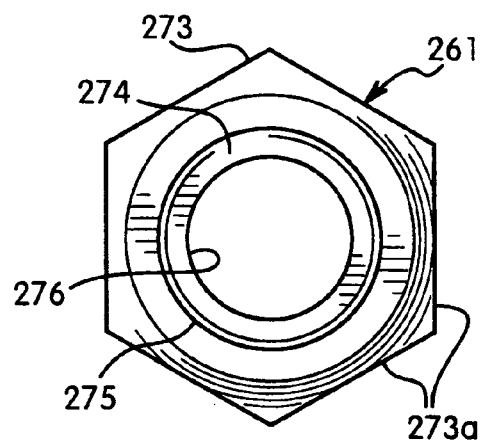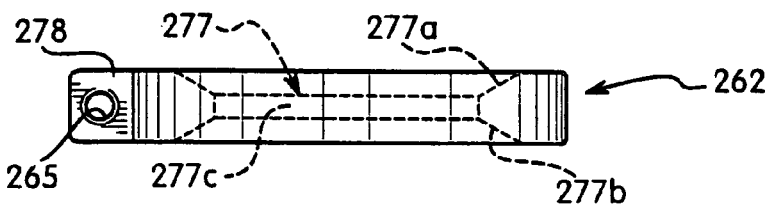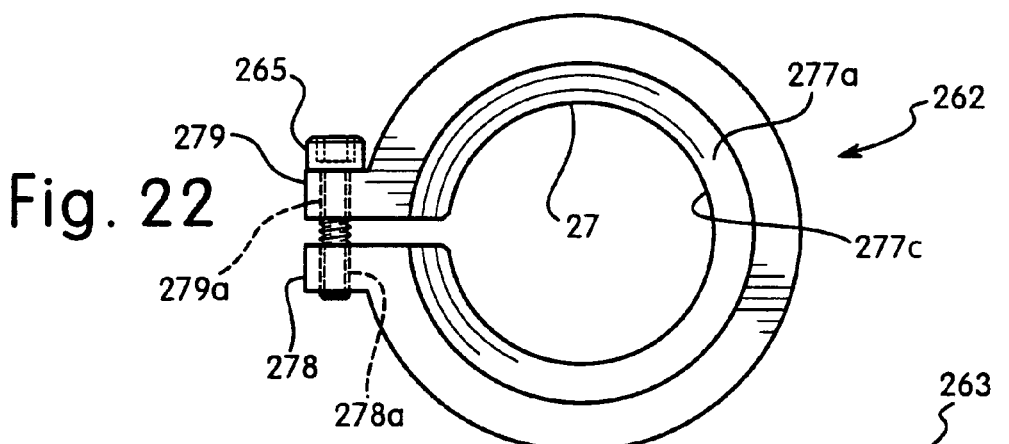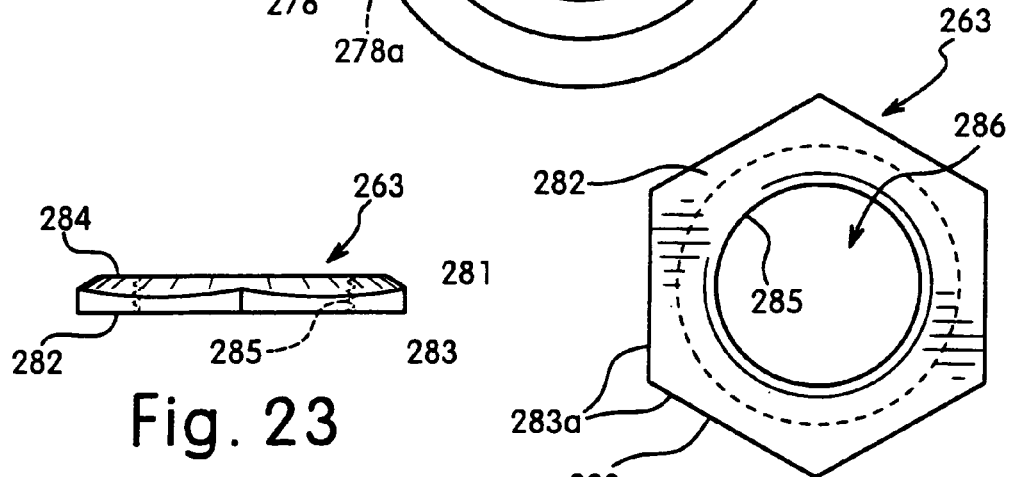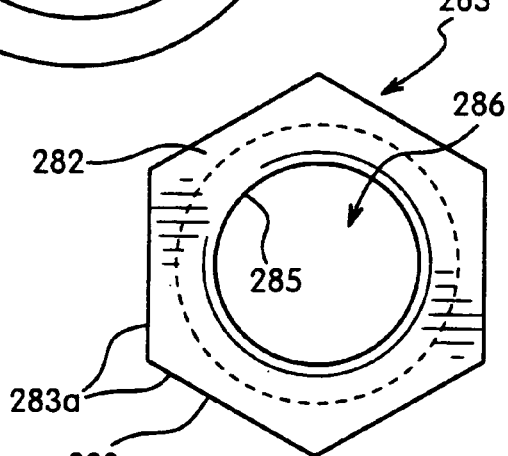

EXPANDABLE BICYCLE HEADSET STRUCTURE

BACKGROUND OF THE INVENTION

1. Field of the Invention

This invention generally relates to an expandable bicycle headset structure for a bicycle. More specifically, the present invention relates to an expandable bicycle headset structure configured to apply an axial force to a headset that rotatably mounts a steerer tube of a front fork to a head tube of a bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle.

Recently, bicycles have been equipped with electrical components to make riding easier and more enjoyable for the rider. Some bicycles are equipped with computer controlled suspensions that are automatically adjusted according to the riding conditions by a cycle computer or control unit. An example of a computer controlled suspension is disclosed in U.S. Pat. No. 6,543,799, which is assigned to Shimano, Inc. Moreover, many new bicycles have automatic shifting units that are automatically adjusted according to the riding conditions by a cycle computer or control unit.

Accordingly, these bicycles with electrical components need to be equipped with control devices for controlling the various electrical components and one or more batteries for supplying electrical power to the various electrical components. Unfortunately, there is a limited amount of space on a bicycle frame to mount all of these electronic components such that the rider has access to the electronic components. In other words, these electronic components are preferably mounted in particular areas of the bicycle such as the handlebar, which further limits the mounting areas for the electronic components. Also it is desirable to mount the electronic components in such a manner as to be attractive and easy to use. Thus, it is desirable to mount the electronic components in such a manner that the wire does not interfere with the operation of the bicycle and the wire does not detract from the appearance of the bicycle.

In view of the above, it will be apparent to those skilled in the art from this disclosure that there exists a need for an improved expandable bicycle headset structure. This invention addresses this need in the art as well as other needs, which will become apparent to those skilled in the art from this disclosure.

SUMMARY OF THE INVENTION

One object of certain embodiments of the present invention is to provide an expandable bicycle headset structure that is configured to apply an axial force to a headset used to rotatably mount a steerer tube of a front fork to a head tube of a bicycle frame.

Another object of certain embodiments of the present invention is to provide an expandable bicycle headset structure that provides an unobstructed passageway or channel through the head tube of the bicycle frame for passing wires from components mounted in the handlebar area to components mounted on the rest of the bicycle.

Another object of certain embodiments of the present invention is to provide an expandable bicycle headset structure that can be used to mount an electrical device or part in a steerer tube of a bicycle fork.

Another object of certain embodiments of the present invention is to provide an expandable bicycle headset structure that is relatively inexpensive to manufacture and relatively simple to install.

The foregoing objects can basically be attained by providing an expandable bicycle headset structure that basically comprises a first tubular member and a second tubular member. The first tubular member has a first free end, a first coupling end with a first mating adjustment structure, and a first bore extending axially between the first free end and the first coupling end. The first bore has an innermost diameter that is sized to receive a steerer tube therethrough. The second tubular member has a second free end, a second coupling end with a second mating adjustment structure, and a second bore extending axially between the second free end and the second coupling end. The second bore has an innermost diameter that is sized to receive the steerer tube therethrough. The first and second mating adjustment structures are adjustably coupled together to change an effective overall axial length of the expandable bicycle headset structure.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 19 is a side elevational view of the first (top) tubular member or spacer of the expandable bicycle headset structure illustrated in FIGS. 14–18 in accordance with the second embodiment of the present invention;

FIG. 20 is a bottom plan view of the first (top) tubular member or spacer illustrated in FIG. 19 for the expandable bicycle headset structure illustrated in FIGS. 14–18 in accordance with the second embodiment of the present invention;

FIG. 21 is a side elevational view of the split locking member or collar of the expandable bicycle headset structure illustrated in FIGS. 14–18 in accordance with the second embodiment of the present invention;

FIG. 22 is a top plan view of the split locking member or collar illustrated in FIG. 21 for the expandable bicycle headset structure illustrated in FIGS. 14–18 in accordance with the second embodiment of the present invention;

FIG. 23 is a side elevational view of the second (bottom) tubular member or spacer of the expandable bicycle headset structure illustrated in FIGS. 14–18 in accordance with the second embodiment of the present invention;

FIG. 24 is a top plan view of the second (bottom) tubular member or spacer illustrated in FIG. 23 for the expandable bicycle headset structure illustrated in FIGS. 14–19 in accordance with the second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
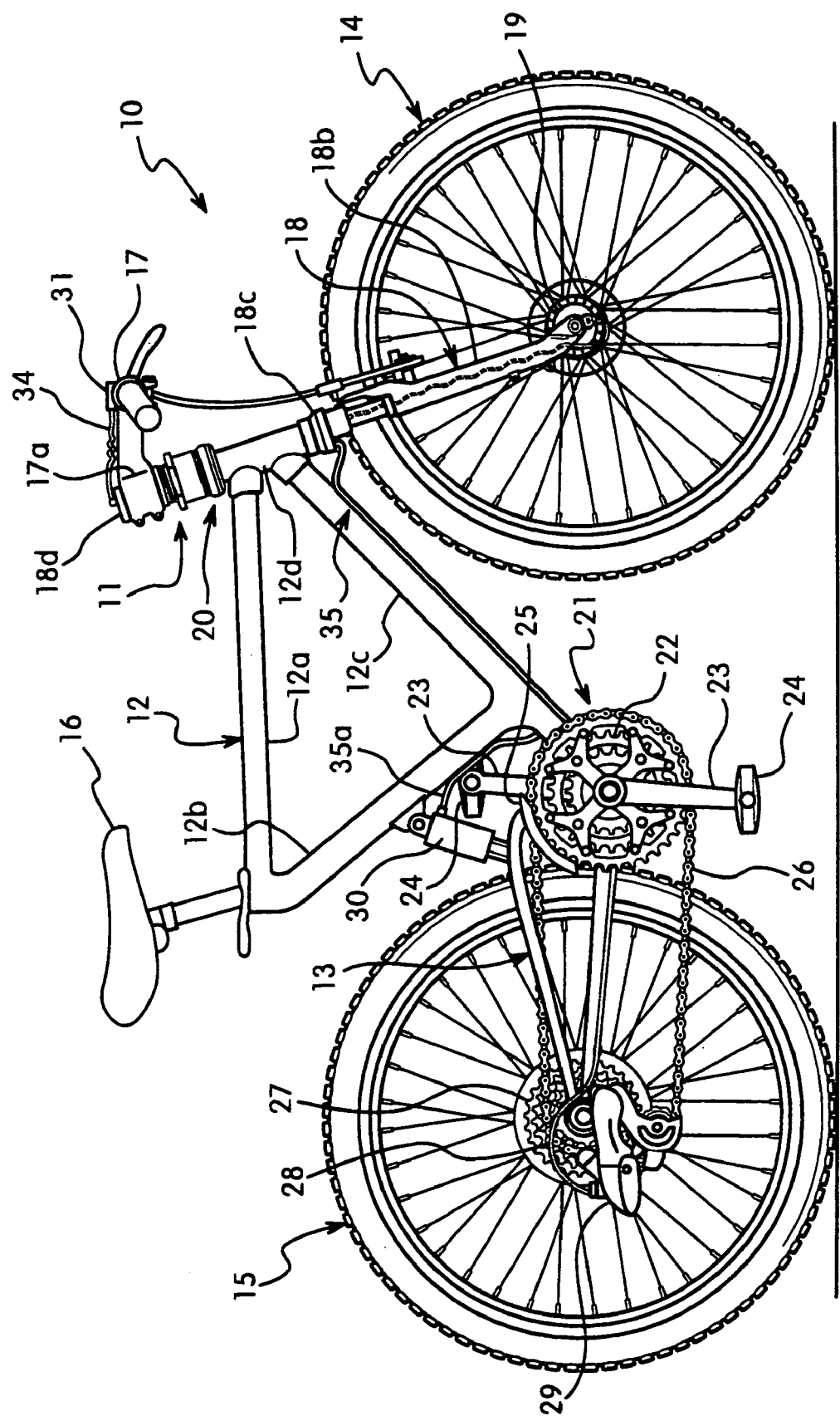
FIG. 1 is a side elevational view of a bicycle that is equipped with an expandable bicycle headset structure in accordance with a first embodiment of the present invention.

Referring initially to FIG. 1, a bicycle 10 is illustrated that is equipped with an expandable bicycle headset structure 11 and various electronic components in such a manner as to carryout a first embodiment of the present invention as discussed below. Bicycles and their various components are well known in the art, and thus, bicycle 10 and its various components will not be discussed and/or illustrated in detail herein, except for the components that relate to the present invention. Also as used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

As seen in FIG. 1, the bicycle 10 basically includes a main frame 12, a rear chain stay 13, a front wheel 14 and a rear wheel 15. The main frame 12 is also equipped with a seat 16, a handlebar 17 and a front suspension fork 18 that rotatably supports the front wheel 14 via a front dynamo hub 19 of the front wheel 14. The main frame 12 basically includes a top tube 12a, a seat tube 12b, a down tube 12c and a head tube 12d.

Figure 2:
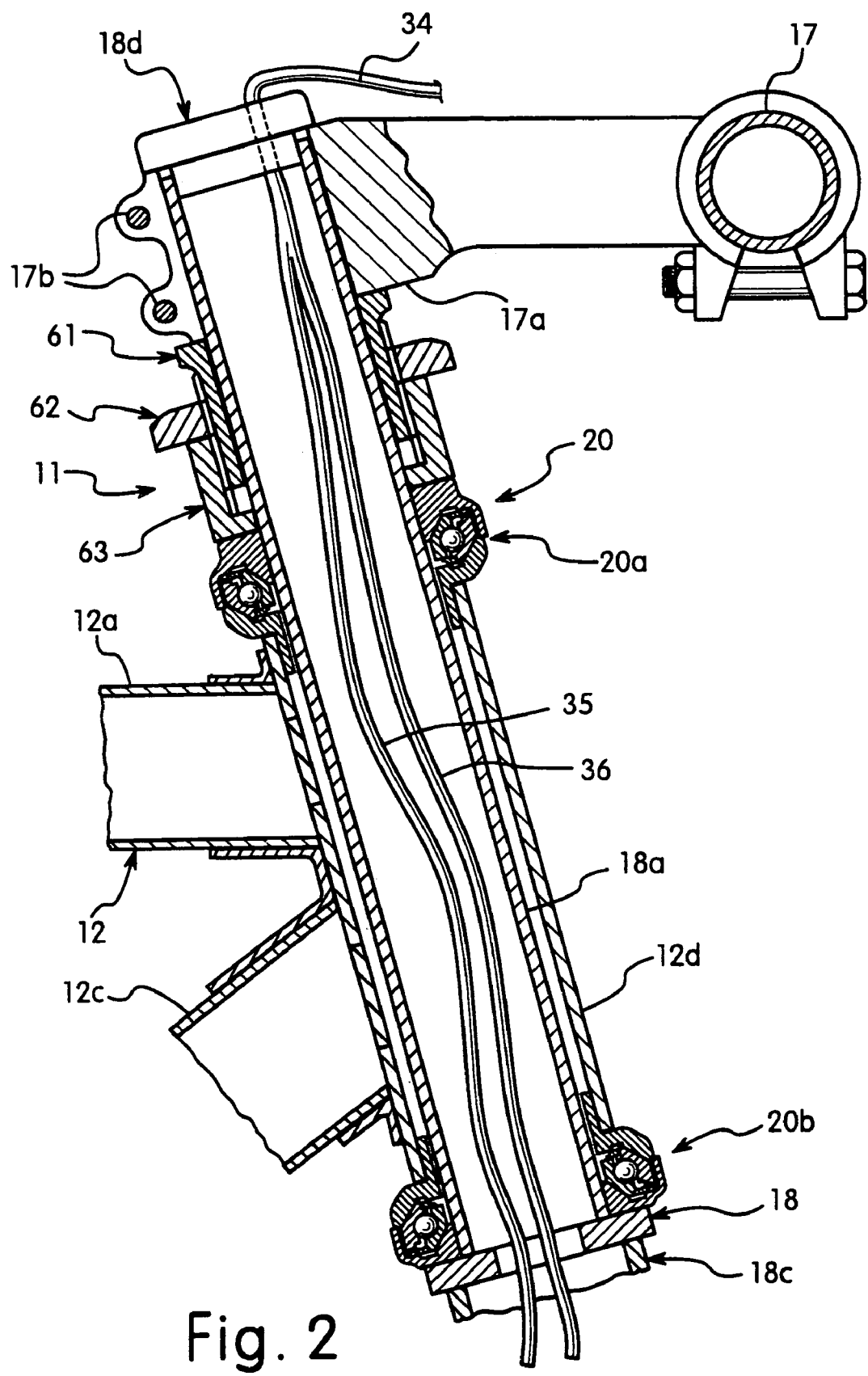
FIG. 2 is a partial enlarged side cross-sectional view of a top portion of the front suspension fork with the expandable bicycle headset structure illustrated in FIG. 1 in accordance with the first embodiment of the present invention.

As seen in FIGS. 1 and 2, an upper end of the front suspension fork 18 is movably coupled to the head tube 12d of the main frame 12, while the lower end of the front suspension fork 18 is coupled to the front dynamo hub 19. The front suspension fork 18 basically includes a steerer tube 18a rotatably mounted in the head tube 12d of the main frame 12 by a headset 20, a pair of telescoping struts 18b that are interconnected by an upper crown 18c which is coupled to the steerer tube 18a. Thus, the front wheel 14 is rotatably mounted to the front suspension fork 18 by the front dynamo hub 19 in conventional manner.

Optionally, a wiring cap 18d is inserted in the upper end of the steerer tube 18a for sealing off the upper end of the steerer tube 18a. Preferably, the wiring cap 18d has one or more bores for receiving one or more electrical cords therethrough. In this embodiment, the wiring cap 18d is a plastic or rubber cap that is frictionally retained in the steerer tub 18a.

The front suspension fork 18 is preferably an electronically controlled suspension that includes an electric dampening device (not shown) that changes the dampening characteristics of the front suspension fork 18. Since the precise structure of the electric dampening device is not important to the present invention, the precise structure of the electric dampening device will not be discussed or illustrated in detail herein. An example of an electronically controlled front suspension is the front suspension of the Nexave C-910 components that are sold by Shimano Inc.

As seen in FIG. 2, the handlebar 17 has a mounting portion 17a that is fixed to the front suspension fork 18 by with a pair of bolts 17b in a conventional manner. Thus, the handlebar 17 is fixed to the front suspension fork 18 for turning the front suspension fork 18 and the front wheel 14 relative to the main frame 12.

As also seen in FIG. 2, the headset 20 includes an upper steering bearing set 20a and a lower steering bearing set 20b. The headset 20 is a relatively conventional part of a bicycle. Thus, the headset 20 will not be discussed or illustrated in detail herein. The handlebar 17 is fixed to the steerer tube 18a of the front suspension fork 18 by the mounting portion 17a. In particular, the mounting portion 17a of the handlebar 17 is a tube clamp in which the inner diameter of the mounting bore decreases upon the tightening of the bolts 17b. In the present invention, the expandable bicycle headset structure 11 is mounted on the steerer tube 18a of the front suspension fork 18 in between the upper steering bearing set 20a and the mounting portion 17a of the handlebar 17. After the mounting portion 17a of the handlebar 17 is fixedly clamped to the steerer tube 18a, the expandable bicycle headset structure 11 is adjusted to apply axial forces to the mounting portion 17a of the handlebar 17 and the headset 20. In particular, the expandable bicycle headset structure 11 is configured and arranged to expand in an axial direction on the steerer tube 18a to apply an axial force to the headset 20. This axial force on the headset 20 allows the user to apply to appropriate load to the upper and lower steering bearing sets 20a and 20b.

Thus, the expandable bicycle headset structure 11 is configured and arranged to aid in the mounting of the steerer tube 18a of the front suspension fork 18 to the head tube 12d of the bicycle frame 12. Also, as discussed below, when the expandable bicycle headset structure 11 mounted on the steerer tube 18a, the center passageway of the steerer tube 18a is unobstructed such that the electrical cords and/or bicycle components can be easily inserted into the steerer tube 18a.

Referring back to FIG. 1, the rear chain stay 13 is pivotally coupled to the main frame 12 by a bottom bracket (not shown). A drive train 21 is also operatively coupled between the main frame 12 and the rear chain stay 13 in a conventional manner. The drive train 21 basically includes a plurality of front chain rings or sprockets 22 mounted on a bottom bracket (not shown), a pair of crank arms 23 with a pair of pedals 24, a front derailleur 25 mounted on the bottom bracket (not shown), a drive chain 26, a plurality of rear sprockets 27 coupled to a rear hub 28 of the rear wheel 15 in a conventional manner, and a rear derailleur 29 mounted to the rear chain stay 13. Since these parts of bicycle 10 are well known in the art, these parts will not be discussed or illustrated in detail herein, except as they are modified to be used in conjunction with the present invention. Moreover, various conventional bicycle parts such as brakes, etc., which are not illustrated and/or discussed herein, are also used in conjunction with the present invention as needed and/or desired.

A rear suspension unit 30 is operatively coupled between the main frame 12 and the rear chain stay 13 to absorb shocks transmitted to the rear wheel 15. The rear suspension unit 30 is an electronically controlled suspension that includes an electric dampening device (not shown) that changes the dampening characteristics of the rear suspension unit 30. Since the precise structure of the electric dampening device is not important to the present invention, the precise structure of the electric dampening device will not be discussed or illustrated in detail herein. An example of an electronically controlled rear suspension is the rear suspension of the Nexave C-910 components that are sold by Shimano Inc.

Figure 3:
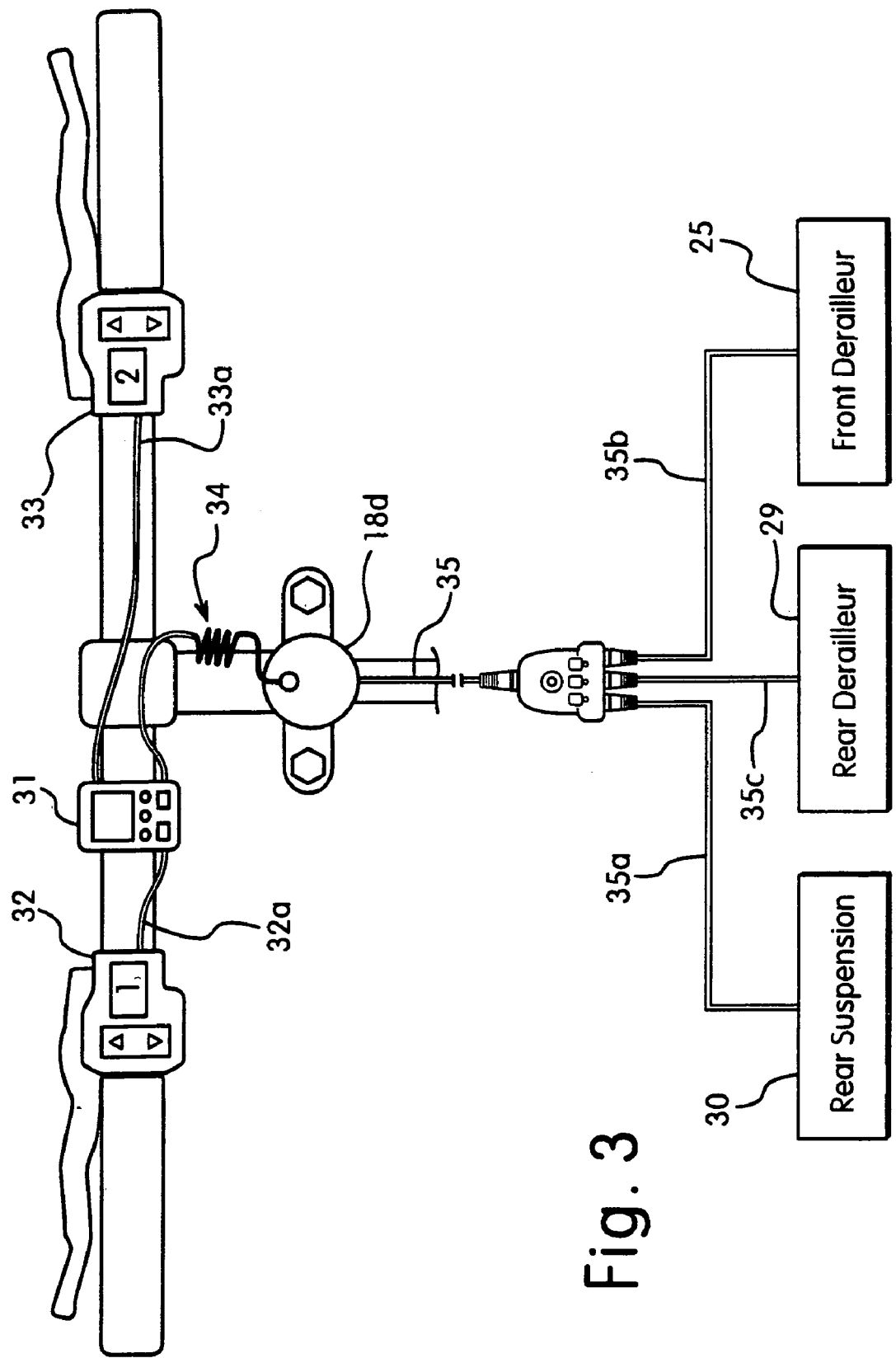
FIG. 3 is a partial top diagrammatic plan view of a front portion of the bicycle illustrated in FIG. 1, which illustrates the various components coupled to the bicycle.
Figure 4:
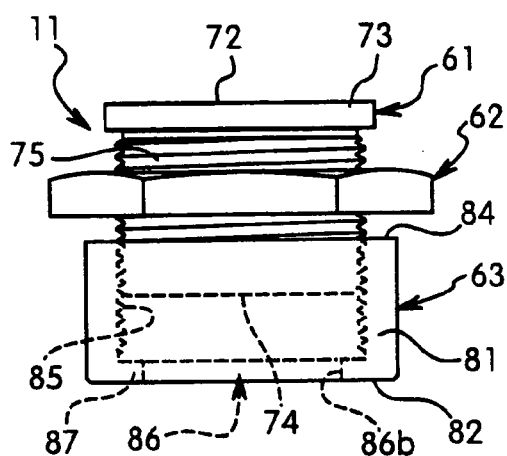
FIG. 4 is a side elevational view of the expandable bicycle headset structure illustrated in FIGS. 1 and 2 in accordance with the first embodiment of the present invention.
Figure 5:
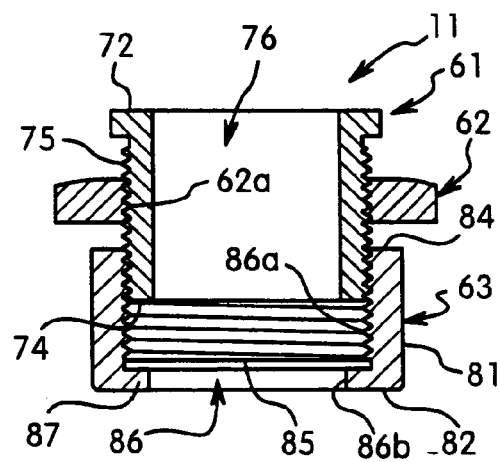
FIG. 5 is a longitudinal cross-sectional view of the expandable bicycle headset structure illustrated in FIG. 4 in accordance with the first embodiment of the present invention.
Figure 6:
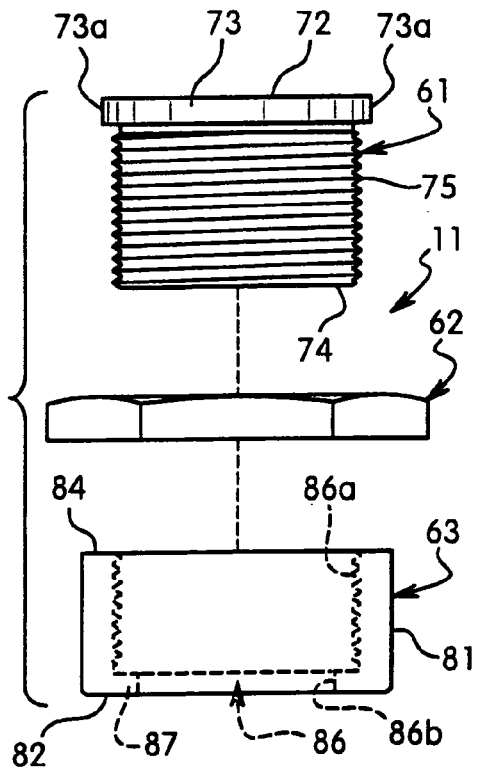
FIG. 6 is an exploded side elevational view of the expandable bicycle headset structure illustrated in FIGS. 1–5 in accordance with the first embodiment of the present invention.
Figure 7:
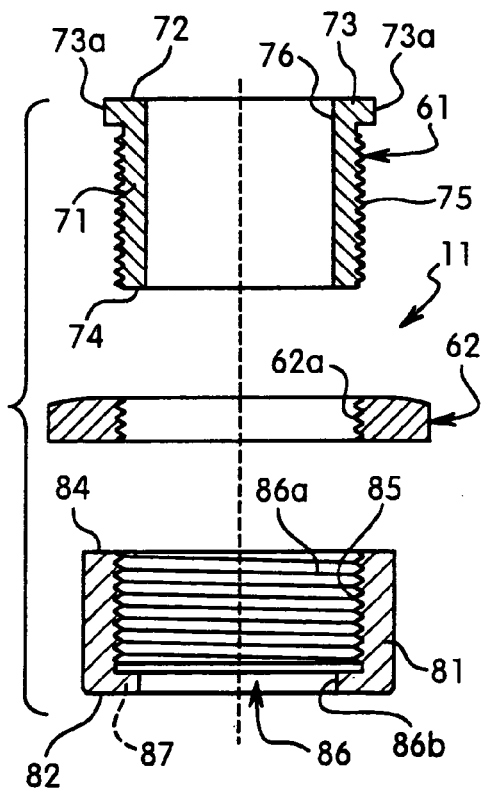
FIG. 7 is an exploded longitudinal cross-sectional view of the expandable bicycle headset structure illustrated in FIG. 6 in accordance with the first embodiment of the present invention.

As seen in FIG. 3, the bicycle 10 is equipped with various electronic control components that are mounted on the handlebar 17. In particular, the bicycle 10 is equipped with a cycle computer 31, a front electronic shifting unit 32 and a rear electronic shifting unit 33. The cycle computer 31 is electrically coupled to various electronic components including, but not limited to, the front dynamo hub 19, the front electronic shifting unit 32, the rear electronic shifting unit 33, the front electric dampening device and the rear electric dampening device. The cycle computer 31 is preferably electrically coupled to these various electronic components by an electrical cord 34 that splits into several feed wires or cord portions (only two electrical cords 35 and 36 will be illustrated in FIG. 2 for the sake of simplicity and for easy of illustration) that each includes a plurality of electrical conductors. Examples of various electronic control components that can be used with the present invention are the Nexave C-910 components that are sold by Shimano Inc.

The cycle computer 31 includes a plurality of push buttons for operating the automatic shifting control and the automatic suspension control. In the illustrated embodiment, as seen in FIG. 2, the cycle computer 31 is electrically coupled to the front electronic shifting unit 32 and the rear electronic shifting unit 33 by electrical cords 32a and 33a, respectively. The cycle computer 31 is preferably configured and arranged with control programs stored for controlling the automatic suspension and the automatic shifting based on the rider input commands and/or riding conditions from sensors (not shown). Alternatively, the cycle computer 31 preferably includes a microcomputer with a control program that controls the automatic shifting control and the automatic suspension control. The cycle computer 31 can also include other conventional components such as an input interface circuit, an output interface circuit, and storage devices such as a ROM (Read Only Memory) device and a RAM (Random Access Memory) device. The microcomputer of the cycle computer 31 is programmed to display various information such as the status of the various components as well as programmed to control automatic shifting control and the automatic suspension control. The memory circuit stores processing results and control programs that are run by the processor circuit.

Referring back to FIG. 2, the electrical cord 35 that extends from the electrical cord 34 electrically couples the cycle computer 31 to the electric dampening device of the rear suspension unit 30, the front derailleur 25 and the rear derailleur 29 thereto.

Preferably, as seen in FIG. 3, the electrical cord 35 splits into several feed wires or cord portions that includes an electrical cord portion 35a electrically coupled to the electric dampening device of the rear suspension unit 30, an electrical cord portion 35b electrically coupled to an electric device of the front derailleur 25, and an electrical cord portion 35c electrically coupled to the rear derailleur 29. Accordingly, each of these cord portions 35a–35c includes a plurality of electrical conductors.

The electrical cord 36 that extends from the electrical cord 34 electrically couples the cycle computer 31 to the electric dampening device of the front suspension fork 18 and the front dynamo hub 19. Preferably, the electrical cord 36 splits into several feed wires or cord portions that include a plurality of electrical conductors.

Since the precise structure of the electrical cords 34, 35 and 36 as well as their various electrical connections are not important to the present invention, the precise structure of the electrical cords 34, 35 and 36 as well as their various electrical connections will not be discussed or illustrated in detail herein. In fact, the structure of the electrical cords 34, 35 and 36 as well as their various electrical connections have been illustrated in a simplified manner for the sake of simplicity and for easy of illustration. Moreover, the construction of the electrical cords 34, 35 and 36 as well as their various electrical connections will depend upon the number and type of electrical components that are connected to the cycle computer 31.

As seen in FIG. 3, the front shifting unit 32 includes a plurality of shifting push buttons for manually shifting the front derailleur 25 when the cycle computer 31 has been set by the rider to a manual mode. In the illustrated embodiment, as seen in FIG. 2, the front shifting unit 32 is electrically coupled to the cycle computer 31 by the electrical cord 32a. In the preferred embodiment, the front shifting unit 32 inputs electrical commands to the cycle computer 31.

As seen in FIG. 3, the rear shifting unit 33 includes a plurality of shifting push buttons for manually shifting the rear derailleur 29 when the cycle computer 31 has been programmed or set by the rider to a manual mode. In the illustrated embodiment, the rear shifting unit 33 is electrically coupled to the cycle computer 31 by the electrical cord 33a. In the preferred embodiment, the rear shifting unit 33 inputs electrical commands to the cycle computer 31.

Turning now to FIGS. 4–7, the expandable bicycle headset structure 11 is coupled to the steerer tube 18a of the front suspension fork 18 in accordance with the first embodiment of the present invention. The expandable bicycle headset structure 11 basically includes a top (first) tubular member or spacer 61, a locking member or nut 62, and a bottom (second) tubular member or spacer 63.

The expandable bicycle headset structure 11 is configured and arranged to aid in the mounting of the steerer tube 18a of the front suspension fork 18 to the head tube 12d of the bicycle frame 12. In particular, the expandable bicycle headset structure 11 is configured and arranged to be mounted on the steerer tube 18a to apply an axial force to the headset 20 that rotatably mounts the steerer tube 18a of the front suspension fork 18 to the head tube 12d of the bicycle frame 12. When the expandable bicycle headset structure 11 is mounted on the steerer tube 18a, the center passageway of the steerer tube 18a is unobstructed such that the electrical cords 35 and 36 can be easily inserted therethrough. As explained below, the top and bottom tubular spacers 61 and 63 are adjustably coupled together to change an effective overall axial length of the expandable bicycle headset structure 11. Thus, top and bottom tubular spacers 61 and 63 apply an axial force to the headset 20 that rotatably mounts the steerer tube 18a of the front suspension fork 18 to the head tube 12d of the bicycle frame 12.

Figure 8:
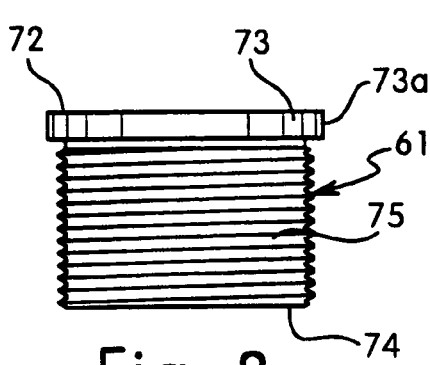
FIG. 8 is a side elevational view of the first (top) tubular member or spacer of the expandable bicycle headset structure illustrated in FIGS. 1–7 in accordance with the first embodiment of the present invention.
Figure 9:
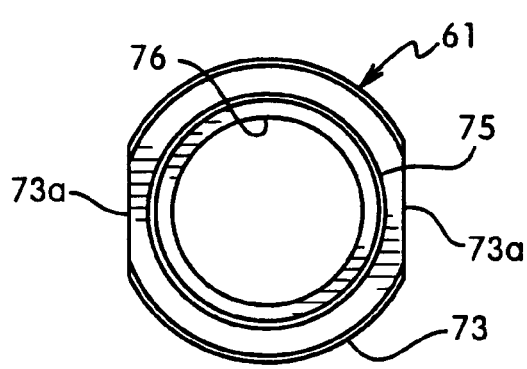
FIG. 9 is a bottom plan view of the first (top) tubular member or spacer illustrated in FIG. 8 for the expandable bicycle headset structure illustrated in FIGS. 1–7 in accordance with the first embodiment of the present invention.

Referring now to FIGS. 8 and 9, the top tubular spacer 61 is preferably constructed as a one-piece, unitary member from a hard rigid material. More preferably, the top tubular spacer 61 is constructed of a metallic material that is especially suitable for bicycles. The top tubular spacer 61 basically includes a tubular body 71 with a first free end 72 with a tool engagement flange 73, and a first coupling end 74 with a set of first threads 75. The top tubular spacer 61 also has a first bore 76 extending axially between the first free end 72 and the first coupling end 74. The first bore 76 has an innermost diameter that is sized to receive the steerer tube 18a therethrough. Preferably, the first bore 76 has a uniform cylindrical surface that is slightly larger than the outer diameter of the steerer tube 18a so that the top tubular spacer 61 fits snugly on the steerer tube 18a as shown.

The tool engagement flange 73 is located at the first free end 72 of the top tubular spacer 61 with an outermost width of the tool engagement flange 73 being greater than the outer diameter of the tubular body 71. The tool engagement flange 73 has an outer peripheral surface with a pair of parallel tool engagement surfaces 73a. Of course, the tool engagement flange 73 can have other non-circular shapes as needed and/or desired. In any event, the tool engagement flange 73 is configured and arranged such that a tool can be used to rotate the top tubular spacer 61 when installed on the steerer tube 18a.

Figure 10:
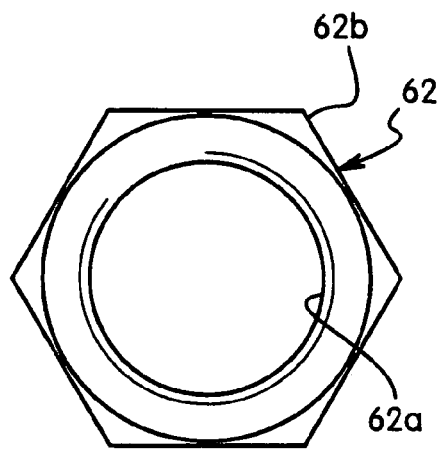
FIG. 10 is a top plan view of the locking member or nut of the expandable bicycle headset structure illustrated in FIGS. 1–7 in accordance with the first embodiment of the present invention.
Figure 11:
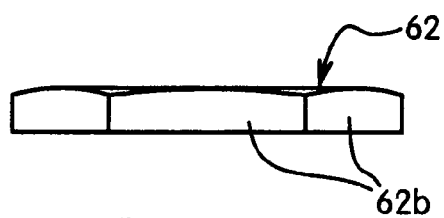
FIG. 11 is a side elevational view of the locking member or nut illustrated in FIG. 10 for the expandable bicycle headset structure illustrated in FIGS. 1–7 in accordance with the first embodiment of the present invention.

Referring now to FIGS. 10 and 11, the locking member or nut 62 is preferably constructed as a one-piece, unitary member from a hard rigid material. More preferably, the locking member or nut 62 is constructed of a metallic material that is especially suitable for bicycles. The locking member or nut 62 is configured and arranged to be selectively set to prevent relative adjustment between the top and bottom tubular spacers 61 and 63. The locking nut 62 is threadedly coupled to the top tubular spacer 61. In particular, the locking nut 62 has internal threads 62a that threadedly engage the first threads 75. Thus, rotation of the locking nut 62 causes the relative axial movement between the top tubular spacer 61 and the locking nut 62. The locking nut 62 also an outer peripheral surface having a non-circular shape that forms a plurality pairs of parallel tool engagement surfaces 62b.

Figure 12:
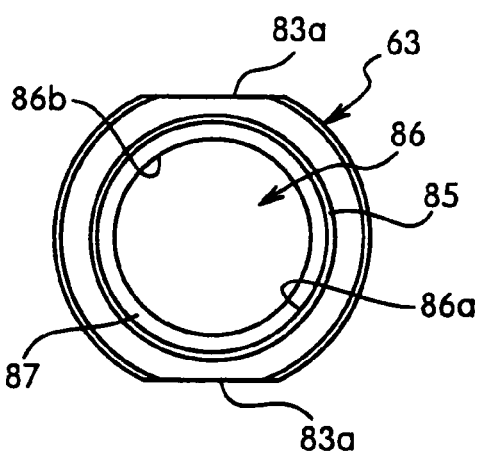
FIG. 12 is a top plan view of the second (bottom) tubular member or spacer of the expandable bicycle headset structure illustrated in FIGS. 1–7 in accordance with the first embodiment of the present invention.
Figure 13:
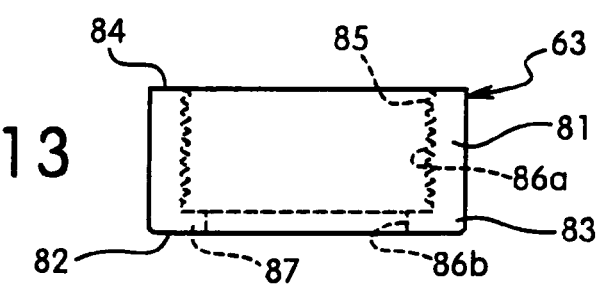
FIG. 13 is a side elevational view of the second (bottom) tubular member or spacer illustrated in FIG. 12 for the expandable bicycle headset structure illustrated in FIGS. 1–7 in accordance with the first embodiment of the present invention.

Referring now to FIGS. 12 and 13, the bottom (second) tubular spacer 63 is preferably constructed as a one-piece, unitary member from a hard rigid material. More preferably, the bottom tubular spacer 63 is constructed of a metallic material that is especially suitable for bicycles. The bottom tubular spacer 63 basically includes a tubular body 81 with a second free end 82 with a tool engagement portion 83 (a pair of parallel surfaces), and a second coupling end 84 with a set of second (internal) threads 85. The bottom tubular spacer 63 also has a second bore 86 extending axially between the second free end 82 and the second coupling end 84. The second bore 86 is preferably a stepped shaped bore with a large diameter cylindrical section 86a having the second threads 85 formed thereon and a small diameter cylindrical section 86b formed by an inner annular flange 87. This inner annular flange 87 defines innermost diameter of the second bore 86. Thus, the innermost diameter of the second bore 86 is sized to receive the steerer tube 18a therethrough. Preferably, the innermost diameter of the second bore 86 is slightly larger than the outer diameter of the steerer tube 18a so that the top tubular spacer 61 fits snugly on the steerer tube 18a as shown. The second threads 85 form an effective inner diameter that is larger than the innermost diameter of the second bore 86 of the bottom tubular spacer 63. The second threads 85 threadedly engage the first threads 75.

The tool engagement portion 83 is located at the second free end 82 of the bottom tubular spacer 63. The tool engagement portion 83 has an outer peripheral surface with a pair of parallel tool engagement surfaces 83a. Of course, the tool engagement portion 83 can have other non-circular shapes as needed and/or desired. In any event, the tool engagement portion 83 is configured and arranged such that a tool can be used to rotate the bottom tubular spacer 63 when installed on the steerer tube 18a.

The first threads 75 form a first mating adjustment structure of the expandable bicycle headset structure 11. The first threads 75 are external threads formed on an outer surface of the top tubular spacer 61. The first threads 75 preferably extend from the first coupling end 74 to the tool engagement flange 73.

The second threads 85 form a second mating adjustment structure of the expandable bicycle headset structure 11. The second threads 85 are internal threads formed on large diameter cylindrical section 86a of the second bore 86. The second threads 85 preferably extend from the second coupling end 84 to the inner annular flange 87. The second threads 85 threadedly engage the first threads 75. Thus, relative rotation between the top tubular spacer 61 and the bottom tubular spacer 63 causes relative axial movement between the top tubular spacer 61 and the bottom tubular spacer 63. In other words, the first and second threads 75 and 85 that form the first and second mating adjustment structures are adjustably coupled together to change an effective overall axial length of the expandable bicycle headset structure 11.

Second Embodiment

Referring now to FIGS. 14–24, an expandable bicycle headset structure 211 in accordance with a second embodiment will now be explained. The expandable bicycle headset structure 211 is installed on the steerer tube 18a of the front suspension fork 18 of the bicycle 10. In other words, the expandable bicycle headset structure 211 replaces the expandable bicycle headset structure 11. Accordingly, in this second embodiment of the present invention, the expandable bicycle headset structure 211 is mounted on the steerer tube 18a of the front suspension fork 18 in between the upper steering bearing set 20a and the mounting portion 17a of the handlebar 17. After the mounting portion 17a of the handlebar 17 is fixedly clamped to the steerer tube 18a, the expandable bicycle headset structure 211 is adjusted to apply axial forces to the mounting portion 17a of the handlebar 17 and the headset 20. In particular, the expandable bicycle headset structure 211 is configured and arranged to expand in an axial direction on the steerer tube 18a to apply an axial force to the headset 20. This axial force on the headset 20 allows the user to apply to appropriate load to the upper and lower steering bearing sets 20a and 20b.

The expandable bicycle headset structure 211 basically includes a top (first) tubular member or spacer 261, a locking member or collar 262, and a bottom (second) tubular member or spacer 263. In this embodiment, the bicycle headset structure 211 also includes an additional bottom (third) tubular member or spacer 264 that located on the steerer tube 18a between the bottom (second) tubular spacer 263 and the upper steering bearing set 20a of the headset 20. As explained below, the top and bottom tubular spacers 261 and 263 are adjustably coupled together to change an effective overall axial length of the expandable bicycle headset structure 211. Thus, top and bottom tubular spacers 261 and 263 apply an axial force to the headset 20 that rotatably mounts the steerer tube 18a of the front suspension fork 18 to the head tube 12d of the bicycle frame 12.

Thus, as in the prior embodiment, the expandable bicycle headset structure 211 is configured and arranged to aid in the mounting of the steerer tube 18a of the front suspension fork 18 to the head tube 12d of the bicycle frame 12. In particular, the expandable bicycle headset structure 211 is configured and arranged to be mounted on the steerer tube 18a to apply an axial force to the headset 20 such that the upper and lower steering bearing sets 20a and 20b are properly loaded. Also when the expandable bicycle headset structure 211 is mounted on the steerer tube 18a, the center passageway of the steerer tube 18a is unobstructed such that the electrical cords 35 and 36 can be easily inserted therethrough.

Referring now to FIGS. 19 and 20, the top tubular spacer 261 is preferably constructed as a one-piece, unitary member from a hard rigid material. More preferably, the top tubular spacer 261 is constructed of a metallic material that is especially suitable for bicycles. The top tubular spacer 261 basically includes a tubular body 271 with a first free end 272 with a tool engagement flange 273, and a first coupling end 274 with a set of first threads 275. The top tubular spacer 261 also has a first bore 276 extending axially between the first free end 272 and the first coupling end 274. The first bore 276 has an innermost diameter that is sized to receive the steerer tube 18a therethrough. Preferably, the first bore 276 has a uniform cylindrical surface that is slightly larger than the outer diameter of the steerer tube 18a so that the top tubular spacer 261 fits snugly on the steerer tube 18a as shown.

The tool engagement flange 273 is located at the first free end 272 of the top tubular spacer 261 with an outermost width of the tool engagement flange 273 being greater than the outer diameter of the tubular body 271. The tool engagement flange 273 has an outer peripheral surface with a plurality of pair of parallel tool engagement surfaces 273a. Of course, the tool engagement flange 273 can have other non-circular shapes as needed and/or desired. In any event, the tool engagement flange 273 is configured and arranged such that a tool can be used to rotate the top tubular spacer 261 when installed on the steerer tube 18a.

Referring now to FIGS. 21 and 22, the split locking member or collar 262 is preferably constructed as a one-piece, unitary member from a hard rigid material, except for the tightening or fastening screw 265 which is a separate element. More preferably, the split locking collar 262 and the tightening screw 265 are constructed of a metallic material that is especially suitable for bicycles. The split locking collar 262 is configured and arranged to be selectively set to prevent relative adjustment between the top and bottom tubular spacers 261 and 263.

The locking collar 262 is a split ring-shaped member having an adjustable inner diameter. The locking collar 262 is configured and arranged to apply an axial force on the top and bottom tubular spacers 261 and 263. The locking collar 262 basically includes a split ring portion with an inwardly tapered section 277 and a pair of generally radially extending flanges 278 and 279. The tapered section 277 is configured and arranged to contact the top and bottom tubular spacers 261 and 263 to apply opposite axial forces. In particular, the tapered section 277 has an upper tapered contact surface 277a, a lower tapered contact surface 277b and a center connecting surface 277c that extends axially between the upper and lower tapered contact surfaces 277a and 277b. The upper and lower tapered contact surfaces 277a and 277b are generally split frustoconical surfaces that converge towards each other as they approach the center axis of the locking collar 262. The center connecting surface 277c is preferably a split cylindrical surface.

The flanges 278 and 279 are provided with holes 278a and 279a that receive the tightening or fastening screw 265. In particular, the hole 278a of the flange 278 is a threaded hole that is threadedly engaged with the fastening screw 265. The hole 279a of the flange 279 is preferably an unthreaded hole in which the shaft portion of the fastening screw 265 freely passes through. The head of the fastening screw 265 is larger than the diameter of the hole 279a of the flange 279.

As the fastening screw 265 is turned, the flanges 278 and 279 are squeezed together to reduce the inner diameter of the locking collar 262. This reduction in diameter of the locking collar 262 causes the upper and lower tapered contact surfaces 277a and 277b to contact the top and bottom tubular spacers 261 and 263 to apply opposite axial forces to the top and bottom tubular spacers 261 and 263. As a result, the top and bottom tubular spacers 261 and 263 are substantially prevented from relative axial movement.

Referring now to FIGS. 23 and 24, the bottom (second) tubular spacer 263 is preferably constructed as a one-piece, unitary member from a hard rigid material. More preferably, the bottom tubular spacer 263 is constructed of a metallic material that is especially suitable for bicycles. The bottom tubular spacer 263 basically includes a tubular body 281 with a second free end 282 and a second coupling end 284. The bottom tubular spacer 263 has an outer peripheral surface that constitutes a tool engagement portion 283 with a plurality of pairs of parallel tool engagement surfaces 283a. Of course, the tool engagement portion 283 can have other non-circular shapes as needed and/or desired. In any event, the tool engagement portion 283 is configured and arranged such that a tool can be used to rotate the bottom tubular spacer 263 when installed on the top tubular spacer 261.

The bottom tubular spacer 263 has a second bore 286 extending axially between the second free end 282 and the second coupling end 284. The second bore 286 has a set of second (internal) threads 285 formed thereon.

The first threads 275 form a first mating adjustment structure of the expandable bicycle headset structure 211. The first threads 275 are external threads formed on an outer surface of the top tubular spacer 261. The first threads 275 preferably extend from the first coupling end 274 to the tool engagement flange 273.

The second threads 285 form a second mating adjustment structure of the expandable bicycle headset structure 211. The second threads 285 are internal threads formed on the second bore 286. The second threads 285 threadedly engage the first threads 275. Thus, relative rotation between the top tubular spacer 261 and the bottom tubular spacer 263 causes relative axial movement between the top tubular spacer 261 and the bottom tubular spacer 263. In other words, the first and second threads 275 and 285 that form the first and second mating adjustment structures are adjustably coupled together to change an effective overall axial length of the expandable bicycle headset structure 211.

Referring back to FIG. 14, the additional bottom (third) tubular spacer 264 is preferably constructed as a one-piece, unitary member from a hard rigid material. More preferably, the additional bottom tubular spacer 264 is constructed of a metallic material that is especially suitable for bicycles. The additional bottom tubular spacer 264 is a cylindrical washer that is concentrically mounted around the tubular body 281 of the bottom tubular spacer 263. Thus, the bore of the additional bottom tubular spacer 264 has an innermost diameter that is sized to receive the tubular body 281 of the bottom tubular spacer 263 therethrough. Preferably, the first bore 276 has a uniform cylindrical surface that is slightly larger than the outer diameter of the steerer tube 18a so that the top tubular spacer 261 fits snugly on the steerer tube 18a as shown.

Various Applications

Figure 14:
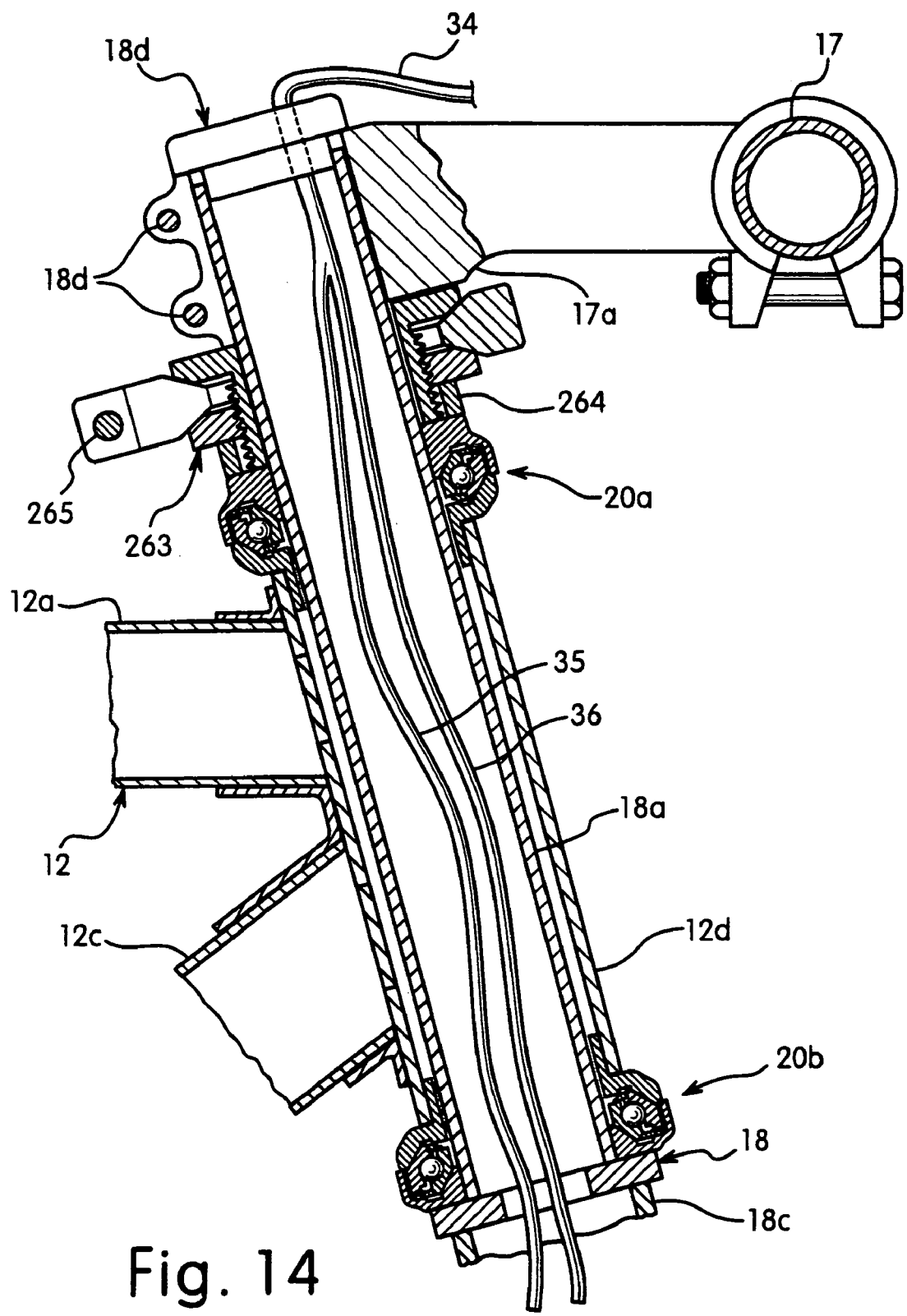
FIG. 14 is a partial enlarged side cross-sectional view of a top portion of the front suspension fork with the expandable bicycle headset structure in accordance with a second embodiment of the present invention.
Figure 15:
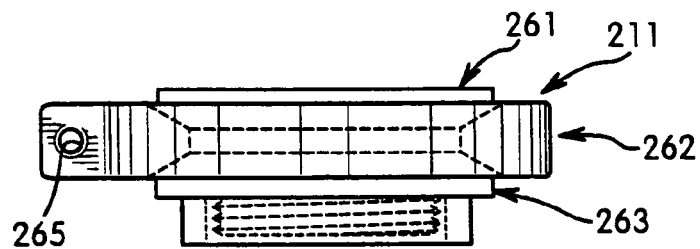
FIG. 15 is a side elevational view of the expandable bicycle headset structure illustrated in FIG. 14 in accordance with the second embodiment of the present invention.
Figure 16:
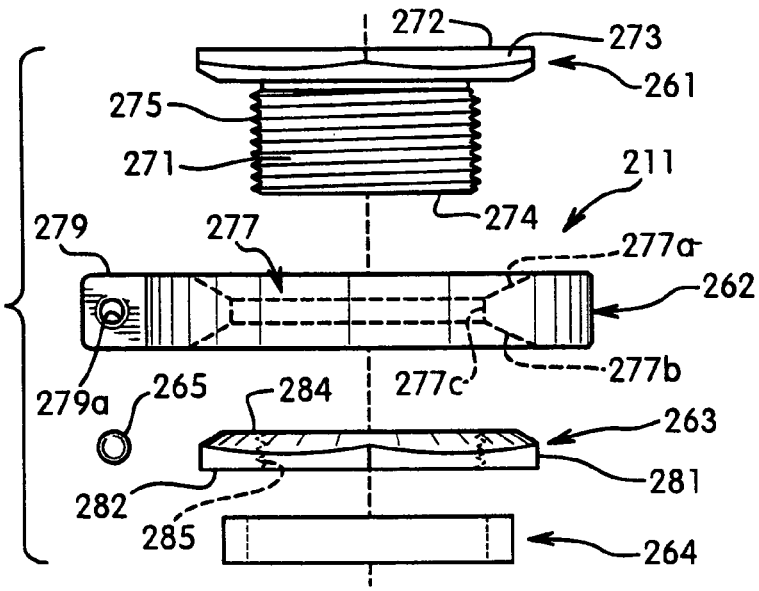
FIG. 16 is an exploded side elevational view of the expandable bicycle headset structure illustrated in FIGS. 14 and 15 in accordance with the second embodiment of the present invention.
Figure 17:
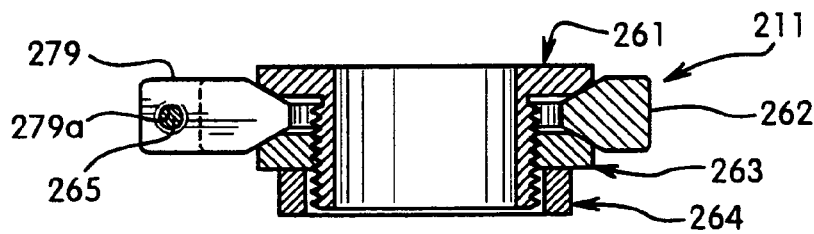
FIG. 17 is a longitudinal cross-sectional view of the expandable bicycle headset structure illustrated in FIGS. 14–16 in accordance with the second embodiment of the present invention.
Figure 18:
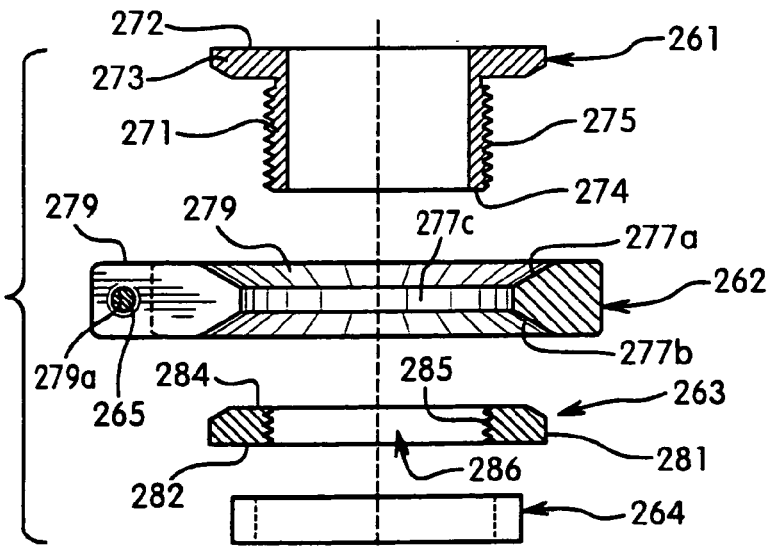
FIG. 18 is an exploded longitudinal cross-sectional view of the expandable bicycle headset structure illustrated in FIGS. 14–17 in accordance with the second embodiment of the present invention.

Referring now to FIGS. 25–28, when one of the expandable bicycle headset structures 11 and 211 are used the steerer tube 18a has an unobstructed passageway that can be used to run wires as shown in FIGS. 3 and 14 or to mount one of the bicycle components $C_1$–$C_4$ as shown in FIGS. 25–28.

Figure 25:
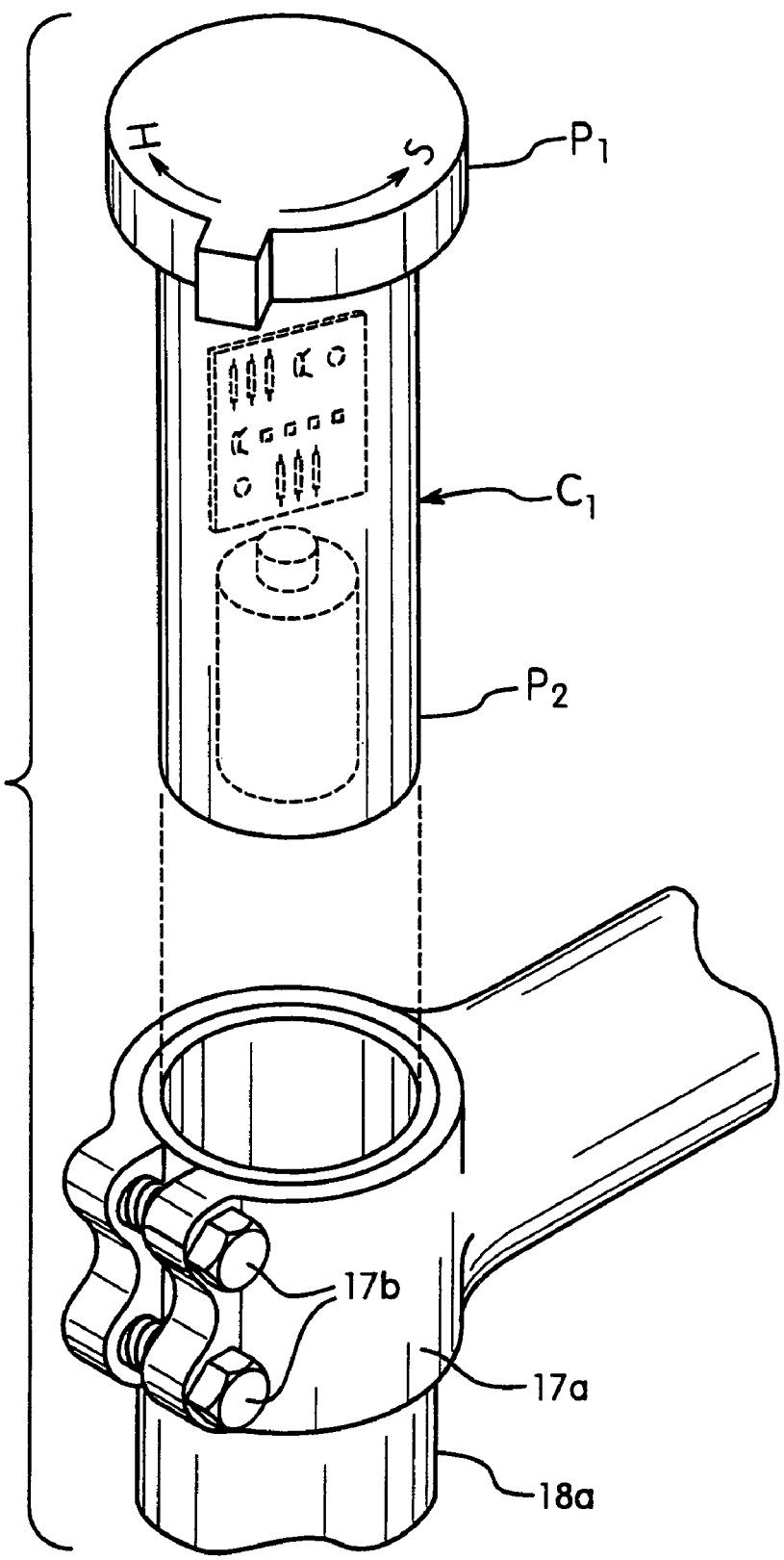
FIG. 25 is a perspective view of an electronic suspension controller mounted in the steerer tube an alternate application in accordance with the present invention.

As seen in FIG. 25, the bicycle component $C_1$ is an electronic suspension controller, i.e., an electrical device, which has an operator using portion $P_1$ and a steerer tube insertion portion $P_2$. A printed circuit board and a battery are located inside the steerer tube insertion portion $P_2$. The operator using portion $P_1$ has an outermost width that is larger than inner diameter of the steerer tube 18a, while the steerer tube insertion portion $P_2$ has an outermost width that is smaller than inner diameter of the steerer tube 18a. Thus, the electronic suspension controller $C_1$ can be inserted into the passageway of the steerer tube 18a such that the steerer tube 18a is located between the steerer tube insertion portion and one of the expandable bicycle headset structures 11 and 211 that is mounted to the steerer tube 18a. The precise structure of the electronic suspension controller $C_1$ is not important to the present invention. Thus, the precise structure of the electronic suspension controller $C_1$ will not be discussed or illustrated in detail herein.

Figure 26:
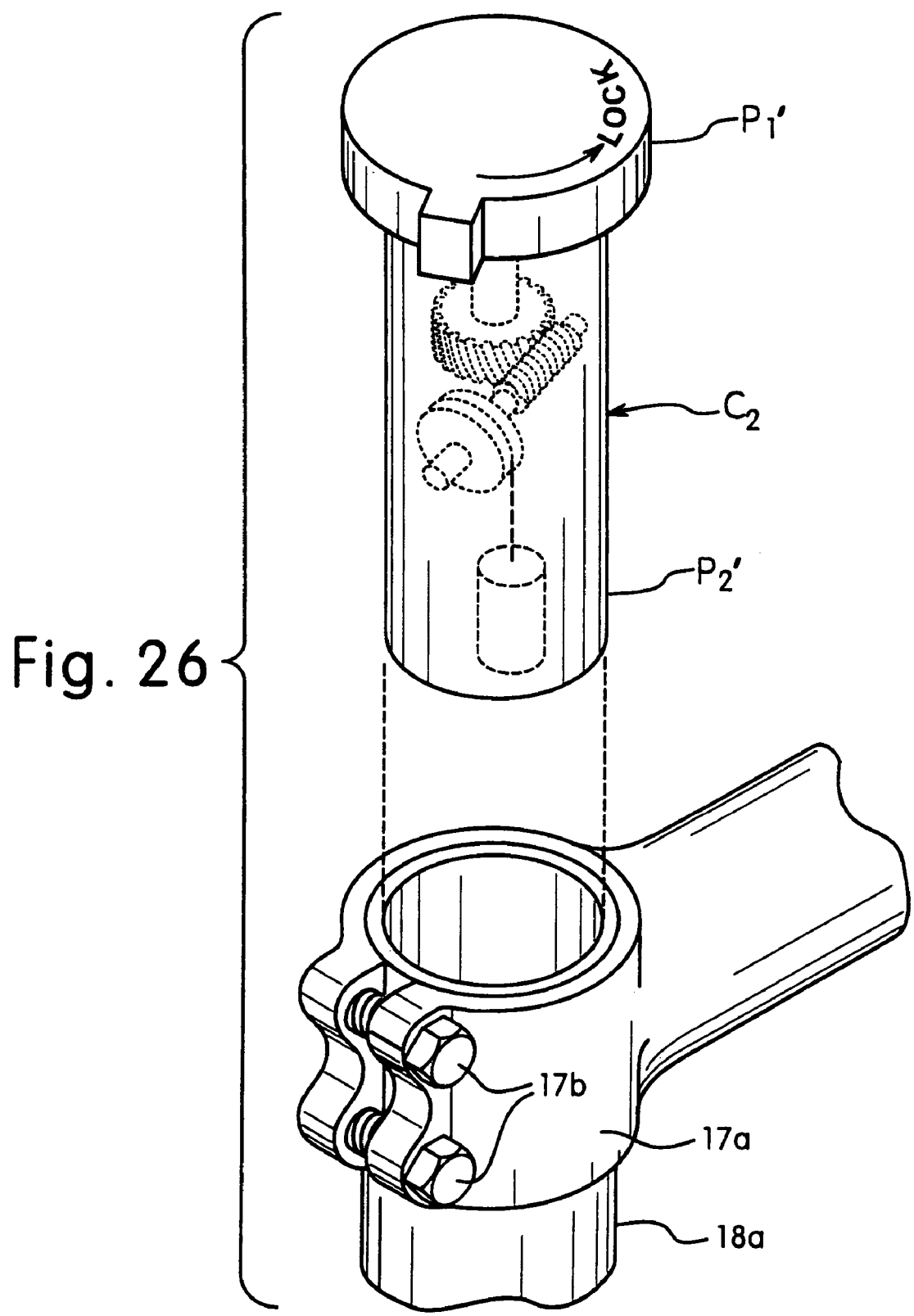
FIG. 26 is a perspective view of a mechanical suspension controller mounted in the steerer tube an alternate application in accordance with the present invention.

As seen in FIG. 26, the bicycle component $C_2$ is a mechanical suspension controller, i.e., a cable operating device, which has an operator using portion $P_1'$ and a steerer tube insertion portion $P_2'$. A cable winding mechanism is located inside the steerer tube insertion portion $P_2'$ for winding an inner wire of a cable in response to rotation of the operator using portion $P_1'$. The operator using portion $P_1'$ has an outermost width that is larger than inner diameter of the steerer tube 18a, while the steerer tube insertion portion $P_2'$ has an outermost width that is smaller than inner diameter of the steerer tube 18a. Thus, the mechanical suspension controller $C_2$ can be inserted into the passageway of the steerer tube 18a such that the steerer tube 18a is located between the steerer tube insertion portion and one of the expandable bicycle headset structures 11 and 211 that is mounted to the steerer tube 18a. The precise structure of the mechanical suspension controller $C_2$ is not important to the present invention. Thus, the precise structure of the mechanical suspension controller $C_2$ will not be discussed or illustrated in detail herein.

Figure 27:
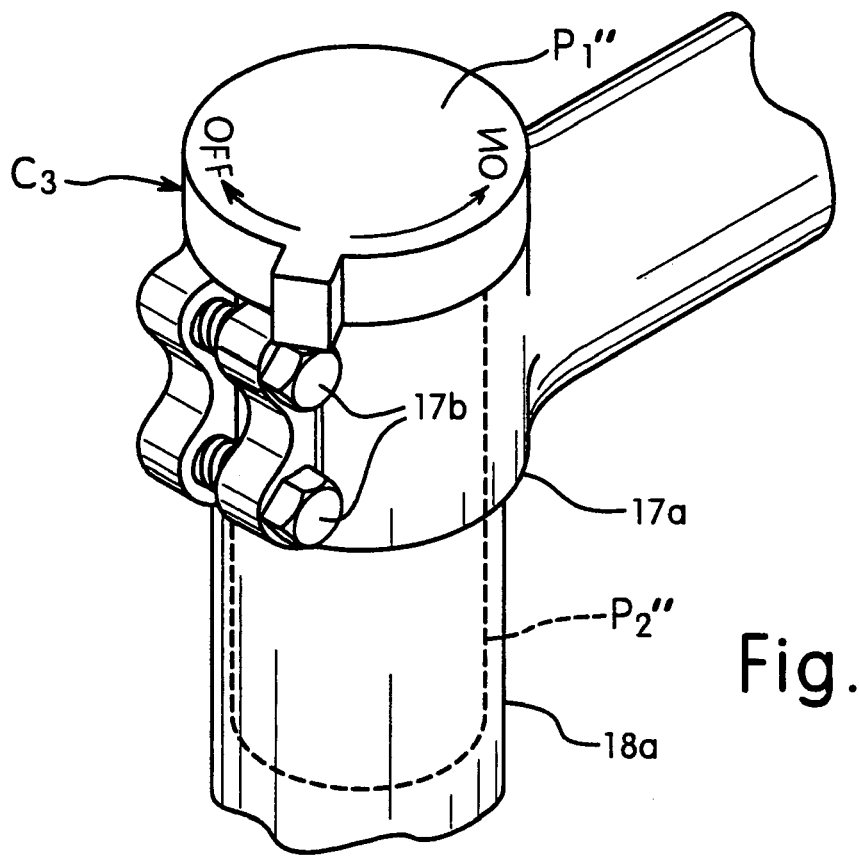
FIG. 27 is a perspective view of a lamp switch mounted in the steerer tube an alternate application in accordance with the present invention.

As seen in FIG. 27, the bicycle component $C_3$ is an electrical switch, i.e., an electrical device, which has an operator using portion $P_1'''$ and a steerer tube insertion portion $P_2'''$. Electrical contacts are located inside the steerer tube insertion portion $P_2'''$ for turning on and off an electrical component of the bicycle such as a lamp in response to rotation of the operator using portion $P_1'''$. The operator using portion $P_1'''$ has an outermost width that is larger than inner diameter of the steerer tube 18a, while the steerer tube insertion portion $P_2'''$ has an outermost width that is smaller than inner diameter of the steerer tube 18a. Thus, the electrical switch $C_3$ can be inserted into the passageway of the steerer tube 18a such that the steerer tube 18a is located between the steerer tube insertion portion and one of the expandable bicycle headset structures 11 and 211 that is mounted to the steerer tube 18a. The precise structure of the electrical switch $C_3$ is not important to the present invention. Thus, the precise structure of the electrical switch $C_3$ will not be discussed or illustrated in detail herein.

Figure 28:
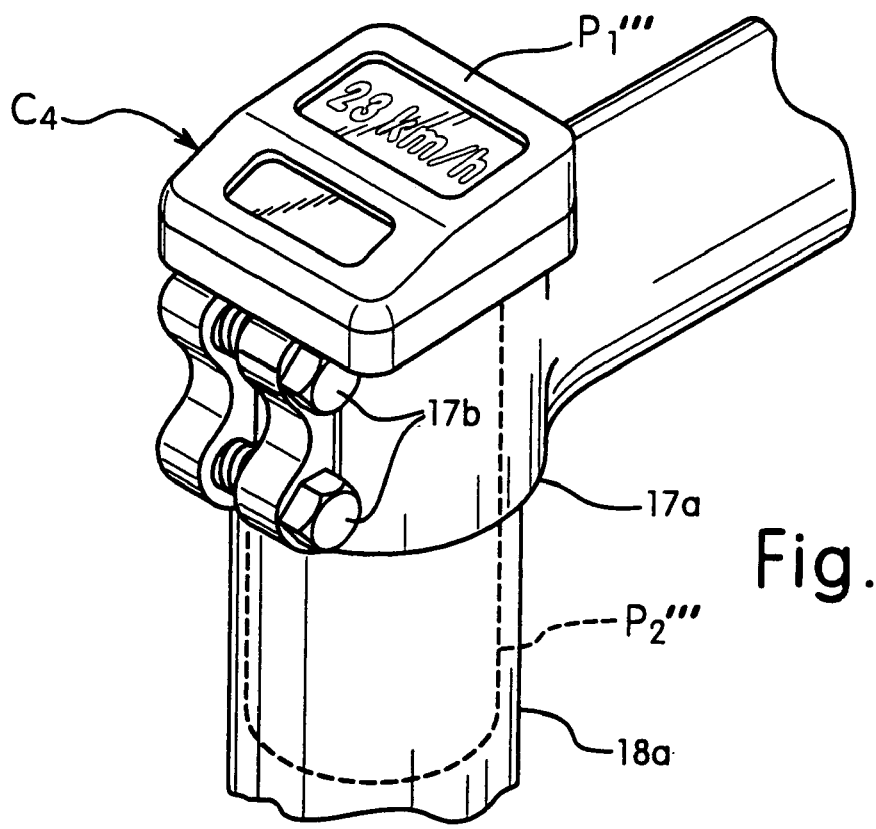
FIG. 28 is a perspective view of a cycle computer or controller mounted in the steerer tube an alternate application in accordance with the present invention.

As seen in FIG. 28, the bicycle component $C_4$ is a cycle computer with a display, i.e., an electrical device, which has an operator using portion P₁"" such as push buttons and a steerer tube insertion portion P₂"". Various electrical parts are located inside the steerer tube insertion portion P₂"" for operating an electrical component of the bicycle and/or displaying information in response to input signals from sensors. The operator using portion P₁"" has an outermost width that is larger than inner diameter of the steerer tube 18*a*, while the steerer tube insertion portion P₂"" has an outermost width that is smaller than inner diameter of the steerer tube 18*a*. Thus, the cycle computer C₄ replaces the cycle computer 31 and can be inserted into the passageway of the steerer tube 18*a* such that the steerer tube 18*a* is located between the steerer tube insertion portion and one of the expandable bicycle headset structures 11 and 211 that is mounted to the steerer tube 18*a*. The precise structure of the cycle computer C₄ is not important to the present invention. Thus, the precise structure of the cycle computer C₄ will not be discussed or illustrated in detail herein.

In the prior embodiments and applications, the terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An expandable bicycle headset structure comprising:
   a first tubular member having a first free end, a first coupling end with a first mating adjustment structure, and a first bore extending axially between the first free end and the first coupling end, the first bore having an innermost diameter that is sized to receive a steerer tube therethrough;
   a second tubular member having a second free end, a second coupling end with a second mating adjustment structure, and a second bore extending axially between the second free end and the second coupling end, the second bore having an innermost diameter that is sized to receive the steerer tube therethrough, the first and second mating adjustment structures being adjustably coupled together to change an effective overall axial length of the expandable bicycle headset, structure; and
   a locking member configured and arranged to be selectively set to prevent relative adjustment between the first and second mating adjustment structures when the first and second tubular members are located in a plurality of different axial positions relative to each other such that the bicycle headset structure is operable with the first and second tubular members located in the plurality of different axial positions,
   the first and second tubular members being mounted between an upper steering bearing set and a mounting portion with the first and second tubular members being adjustably exposed when adjustably coupled such that an overall effective length of the first and second tubular members can be changed in an assembled state,
   the first mating adjustment structure including a set of first threads, and the second mating adjustment structure including a set of second threads that are threadedly engaged with the first threads to prevent axial separation of the first and second mating adjustment structures when the first and second threads are threadedly engaged,
   the locking member being constructed as a separate member from the first and second tubular members that is threadedly coupled to one of the first and second threads such that rotation of the locking member relative to the one of said first and second threads is used in order for the locking member to be selectively set.

2. The expandable bicycle headset structure according to claim 1, wherein
   the locking member includes a locking nut that is threadedly coupled to one of the first and second threads.

3. The expandable bicycle headset structure according to claim 2, wherein
   the first threads are external threads formed on an outer surface of the first tubular member, and the second threads are internal threads formed on an inner surface of the second bore of the second tubular member.

4. The expandable bicycle headset structure according to claim 3, wherein
   the innermost diameter of the first bore of the first tubular member is substantially identical to the innermost diameter of the second bore of the second tubular member.

5. The expandable bicycle headset structure according to claim 4, wherein
   the second set of threads has an effective inner diameter that is larger than the innermost diameter of the second bore of the second tubular member.

6. The expandable bicycle headset structure according to claim 5, wherein
   the first tubular member has a flange located at the first free end of the first tubular member with an outermost width that is greater than the outer diameter of the first set of threads.

7. The expandable bicycle headset structure according to claim 6, wherein
   the flange of the first tubular member has an outer peripheral surface with a pair of parallel tool engagement surfaces.

8. The expandable bicycle headset structure accordingly to claim 1, wherein
   the innermost diameter of the first bore of the first tubular member is substantially identical to the innermost diameter of the second bore of the second tubular member.

9. The expandable bicycle headset structure according to claim 1, wherein
   the first tubular member has a flange located at the first free end of the first tubular member, the flange having an outer peripheral surface with a pair of parallel tool engagement surfaces.

10. An expandable bicycle headset structure comprising:
    a first tubular member having a first free end, a first coupling end with a first mating adjustment structure, and a first bore extending axially between the first free end and the first coupling end, the first bore having an innermost diameter that is sized to receive a steerer tube therethrough, the first mating adjustment structure including a set of first threads;
    a second tubular member having a second free end, a second coupling end with a second mating adjustment structure, and a second bore extending axially between the second free end and the second coupling end, the second bore having an innermost diameter that is sized to receive the steerer tube therethrough, the first and second mating adjustment structures being adjustably coupled together to change an effective overall axial length of the expandable bicycle headset structure, the second mating adjustment structure including a set of second threads that are threadedly engaged with the first threads;

a locking member configured and arranged to be selectively set to prevent relative adjustment between the first and second mating adjustment structures when the first and second tubular members are located in a plurality of different axial positions relative to each other such that the bicycle headset structure is operable with the first and second tubular members located in the plurality of different axial positions, the locking member including a split locking collar having an adjustable inner diameter, a first tapered surface that engages the first tubular member, and a second tapered surface that engages the second tubular member, the first and second tapered surfaces being configured and arranged to apply an axial force on the first and second tubular members.

11. The expandable bicycle headset structure according to claim 10, wherein
the first mating adjustment structure includes a set of first threads, and the second mating adjustment structure includes a set of second threads that are threadedly engaged with the first threads.

12. The expandable bicycle headset structure according to claim 11, wherein
the first threads are external threads formed on an outer surface of the first tubular member, and the second threads are internal threads formed on an inner surface of the second bore of the second tubular member.

13. The expandable bicycle headset structure according to claim 12, wherein
the innermost diameter of the first bore of the first tubular member is substantially identical to the innermost diameter of the second bore of the second tubular member.

14. The expandable bicycle headset structure according to claim 12, wherein
the second threads has an effective inner diameter that is larger than the innermost diameter of the second bore of the second tubular member.

15. The expandable bicycle headset structure according to claim 10, wherein
the first tubular member has a flange located at the first free end of the first tubular member with an outermost width that is greater than the outer diameter of the first threads.

16. The expandable bicycle headset structure according to claim 15, wherein
the flange of the first tubular member has an outer peripheral surface with a pair of parallel tool engagement surfaces.

17. An expandable bicycle headset structure comprising:
a first tubular member having a first free end, a first coupling end with a first mating adjustment structure, and a first bore extending axially between the first free end and the first coupling end, the first bore having an innermost diameter that is sized to receive a steerer tube therethrough;
a second tubular member having a second free end, a second coupling end with a second mating adjustment structure, and a second bore extending axially between the second free end and the second coupling end, the second bore having an innermost diameter that is sized to receive the steerer tube therethrough, the first and second mating adjustment structures being adjustably coupled together to change an effective overall axial length of the expandable bicycle headset structure; and
a bicycle component having an operator using portion with an outermost width that is larger than the first bore of the first tubular member, and a steerer tube insertion portion with an outermost width that is smaller than the first bore of the first tubular member such that the steerer tube is located between the first tubular member and the steerer tube insertion portion.

18. The expandable bicycle headset structure according to claim 17, wherein
the bicycle component is an electrical device.

19. The expandable bicycle headset structure according to claim 17, wherein
the bicycle component is a cable operating device.

20. The expandable bicycle headset structure according to claim 17, wherein
the bicycle component is a suspension controller.

21. The expandable bicycle headset structure according to claim 17, wherein
the bicycle component is an electrical switch.

22. The expandable bicycle headset structure according to claim 17, wherein the bicycle component is a cycle computer with a display formed in the operator using portion.

* * * * *